Figure 1:
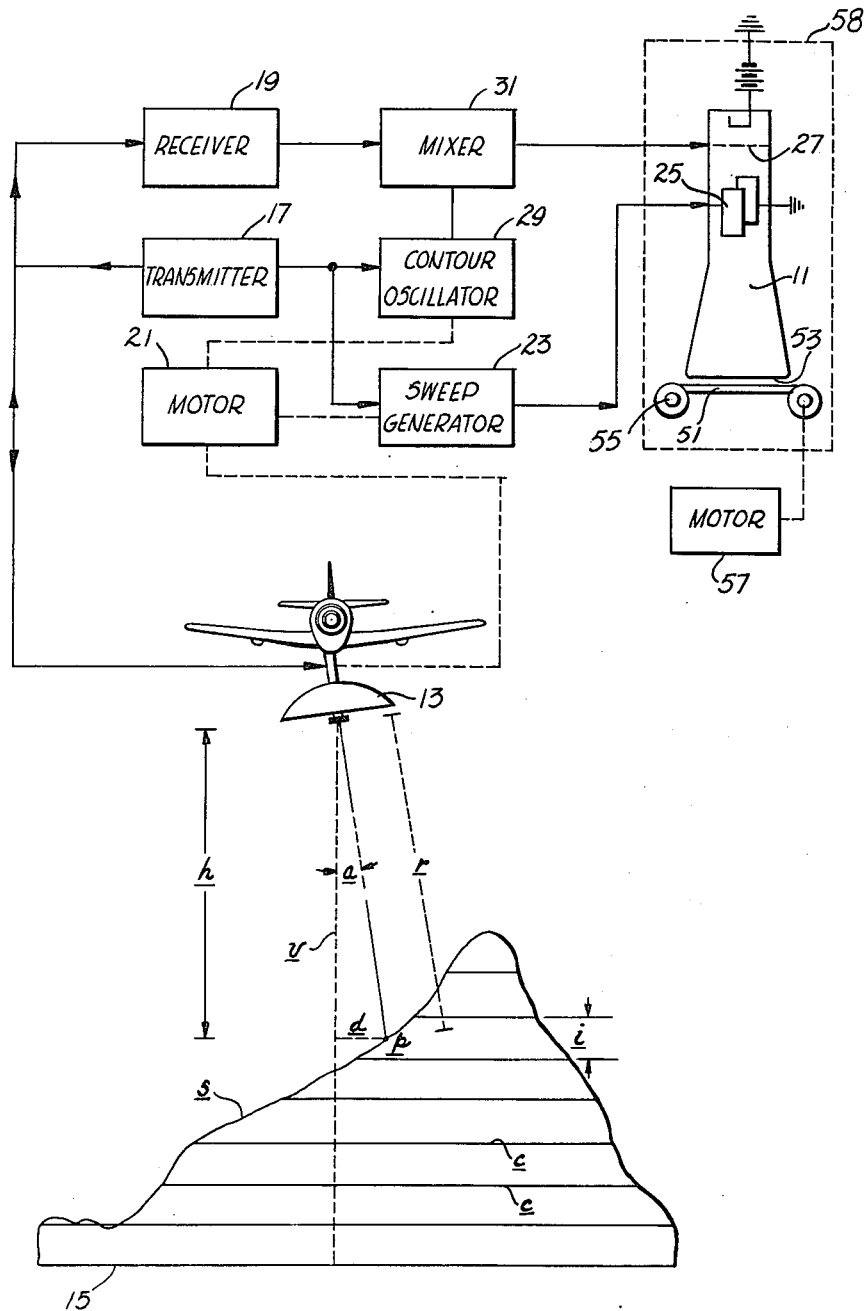

Oct. 28, 1952  W. T. HOLSER  2,616,077
RADIO ECHO SYSTEM FOR MAPPING CONTOURS
Filed May 20, 1947  2 SHEETS—SHEET 1

INVENTOR.
WILLIAM T. HOLSER
BY
*M. C. Hayes*
ATTORNEY

Oct. 28, 1952 W. T. HOLSER 2,616,077
RADIO ECHO SYSTEM FOR MAPPING CONTOURS
Filed May 20, 1947 2 SHEETS—SHEET 2
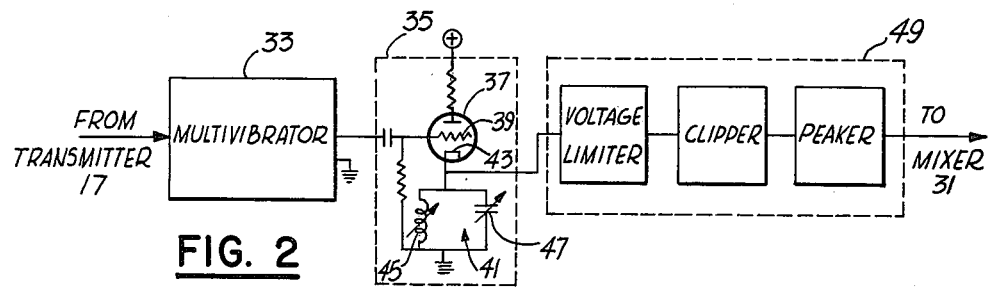
FIG. 2
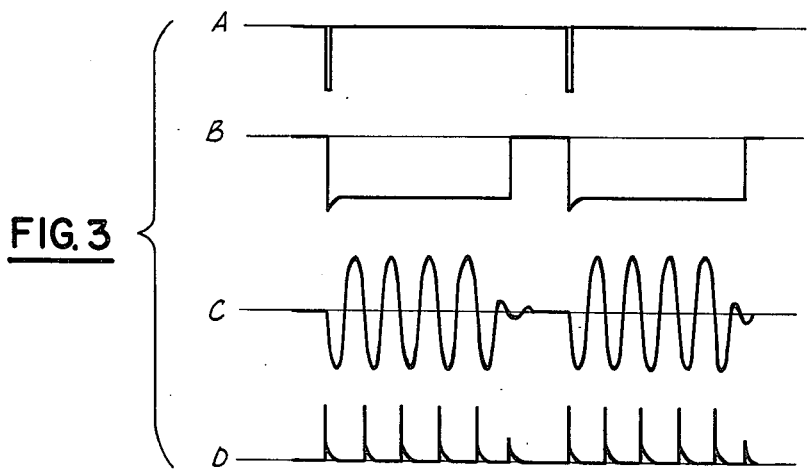
FIG. 3
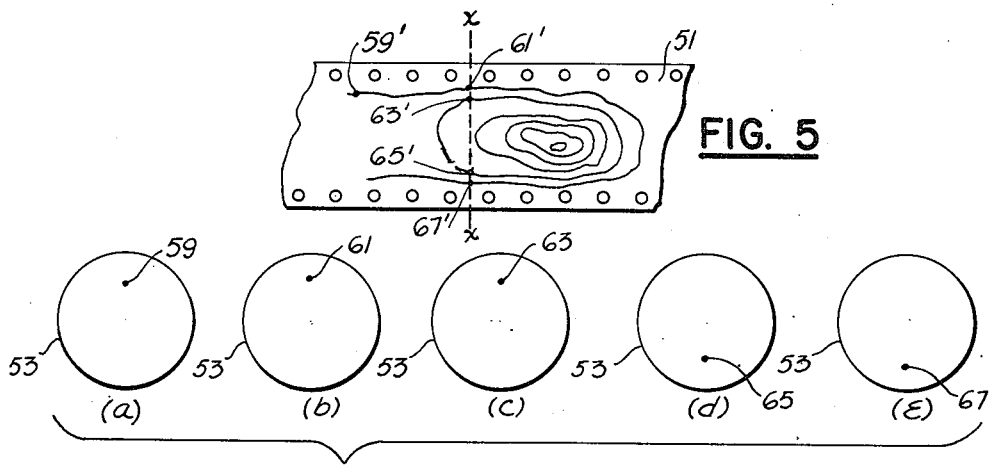
FIG. 5
FIG. 4
INVENTOR.
WILLIAM T. HOLSER
BY
M. A. Hayes
ATTORNEY Patented Oct. 28, 1952

2,616,077

UNITED STATES PATENT OFFICE 2,616,077

RADIO ECHO SYSTEM FOR MAPPING CONTOURS

William T. Holser, Los Angeles, Calif.

Application May 20, 1947, Serial No. 749,371

11 Claims. (Cl. 343—5)

(Granted under the act of March 3, 1883, as amended April 30, 1928; 370 O. G. 757)

The present invention relates to the art of map making, and more particularly to apparatus for and methods of plotting topographic or contour maps from data derived through the use of wave-energy signals from a surface to be surveyed.

Heretofore, aerial topographic map making has been accomplished by means of air-borne apparatus including a camera whereby stereoscopic photographs of the surface are obtained. Such photographs have yielded useful information relating to the physical features of the surface, and the information has been transferred, by suitable methods and means, to charts or maps to provide a permanent record of the physical features.

The apparatus of the prior art has been known to produce useful maps only under good conditions of visibility since, in the operation of such apparatus, visible light has been required to provide the stereoscopic photographs. This condition markedly limits the field of use of such apparatus, and actually renders it inoperative for substantial periods of time and in certain geographic regions, as for example, at the polar regions.

Accordingly, it is a principal object of the present invention to provide novel and useful apparatus for and methods of making topographic maps wherein wave energy of non-optical frequencies is employed to provide information relating to the physical features of the surface to be surveyed.

Another object of the invention resides in the provision of a topographic mapping apparatus having means for transmitting a beam of invisible radiation toward a surface to be surveyed, means for receiving a portion of the radiation after reflection thereof by the surface, means for deriving data relating to the range of the part of the surface from which the radiation is reflected, and means for translating the range data into a record of the physical features of the surface.

It is a feature of the invention to provide a topographic map making system including distance or range-determining means operable with wave energy of extra-optical frequencies for scanning and "illuminating" a surface with a well-defined beam of the wave energy, means for receiving a portion of the wave energy reflected from the surface, means for transforming said received portion into visual indications corresponding to the range of the reflecting surface from the apparatus, and means for translating the visual range indications into permanent records or delineations of the contour of the surface. By the present invention, topographical surveys of surfaces may be accomplished even under such conditions that render visible observation impossible.

Thus, through the use of ultra-high-frequency electro-magnetic wave-energy range-determining apparatus, arranged in accordance with the invention, aerial surveys of the earth's surface may be made in darkness or during conditions of rain, cloud, fog, or general overcast. Also, surveys of underwater terrain may be accomplished as by the use of underwater, supersonic wave-energy range-determining apparatus.

With the foregoing and other objects in view, the invention includes the novel combinations and correlations of elements described below and illustrated in the accompanying drawing, in which Fig. 1 represents, somewhat schematically, a topographic map making apparatus in accordance with the invention, Fig. 2 is a block diagram, partly schematic, of a contour oscillator forming part of the apparatus shown in Fig. 1, Fig. 3 represents the transformation of the character of the wave energy effected in the contour oscillator of Fig. 2, Figs. 4 (a) through (e) are views of the screen of the cathode ray tube illustrated in Fig. 1, and Fig. 5 is a plan view of a fragment of photo-sensitive film exposed in accordance with the invention.

A simple application of the present invention is shown in Fig. 1, wherein a cathode-ray tube, indicated generally at 11, is arranged to provide an indication of the horizontal displacement $d$ of a point $p$ on the surfaces of a terrain to be surveyed from a line $v$ drawn from a projector 13 perpendicularly to a datum plane 15 of the terrain. The point $p$ is the instantaneous point of incidence and reflection of a beam of ultra-high-frequency wave energy radiated from the projector 13 as the latter scans the surface to be surveyed, as will appear.

For explanatory purposes the projector 13 is diagrammatically shown as a directional antenna of the type commonly employed in air-borne or other radar systems for radiating a well-defined beam of pulsed ultra-high-frequency electromagnetic radiation toward a reflecting surface, and for picking up a portion of the radiation reflected from the surface.

It will be understood, while I have herein disclosed and described the invention as embodied in such a radar apparatus, whereby surveying exposed surfaces of terrain may be accomplished, the invention is adaptable to sonar apparatus borne by marine craft for surveys of underwater terrain as well as other types of apparatus useful in geophysical prospecting.

As shown in Fig. 1, antenna 13 is fed with ultra-high-frequency energy pulses generated in a pulse transmitter 17, the latter being of any suitable conventional design for generating high-energy pulses of extremely short duration and spaced at a predetermined time interval substantially greater than the duration of the pulses. Such transmitters are well-known to those skilled in the art, and a full description thereof, as well as of the conventional receiver apparatus, shown at 19, for receiving a portion of the surface-reflected beam, is not deemed necessary. As is also well-known in so-called duplexing systems, suitable transmit-receive (T-R) and anti-transmit-receive (A-T-R) devices (not shown) may be placed in the line from the transmitter to the antenna, and in the line from the receiver to the antenna for the usual purposes and in the usual manner. Such a duplexing arrangement is disclosed and described in an article entitled "Considerations in the Design of Centimeter-Wave Radar Receivers," by Steward E. Miller, Proceedings of the I. R. E., April 1947, page 341, et seq.

In accordance with the invention, the surface $s$ to be surveyed is scanned by the high-frequency energy beam, and, to this end, the antenna 13 is mounted for limited controlled oscillation or rotation about an axis parallel to the direction of travel of the craft bearing the radar. Thus, assuming that the craft is flying a level course normal to the plane of the drawing of Fig. 1, the antenna is driven by a motor 21 so as to oscillate through an angle the half-value of which is indicated as $a$.

It will be understood that conventional radar range-determining apparatus, operated in the usual manner and under the conditions above-described, normally provides a continuous record of range values corresponding to the distance $r$ between the craft and the instantaneous point of incidence $p$ of the beam on the surface $s$. Such operation is characteristic of conventional radio-altimeters and terrain-clearance indicators.

To obtain data useful for making a contour map of the surface $s$, however, such range data, according to the invention, is utilized in a manner such that only those range values are employed that correspond to integral multiples of a preselected contour interval $i$ according to which the contour map indicates variation in elevation. For the purpose of the present description, a plurality of contour planes are considered to be in spaced parallel relation and parallel to the datum plane 15. Such contour planes are shown intersecting the surface $s$ in lines $c$, the latter being mutually spaced by the contour interval $i$. Of course, any desirable contour interval $i$ may be selected depending on the desired scale of the map to be constructed and the nature of the terrain to be surveyed.

It will be seen that, with the apparatus-bearing craft flying a course at constant altitude, and for oscillation angles $a$ of the antenna 13 equal to zero or very small values other than zero, range values $r$ that are obtained are substantially equal to the vertical distance $h$ of the craft above the point of incidence $p$. However, for oscillation angles $a$ substantially greater than zero, or, for so-called wide-angle scanning, the range values $r$ obtained are substantially different from the vertical distance, and are actually of magnitude given by the expression $$r = h/\cos a \qquad (1)$$

As mentioned above, conventional range-measuring radar systems and terrain-clearance indicators are known, which provide visual indications, as by means of cathode-ray oscilloscope, of the instantaneous values of the range $r$. In the present apparatus, however, in order to map, in plan, the desired information relating to the variation of elevation of the surface, visual indications of the changes in magnitudes of the horizontal displacements $d$ of the points $p$ from the true vertical are provided, corresponding to the variation in altitude of the points $p$ above the datum plane 15. Clearly, such values of $d$ are given by $$d = r \sin a \qquad (2)$$

For providing deflections of the electron stream in the cathode-ray tube 11 which are proportional to instantaneous values of the horizontal displacements $d$ as given in equation (2), there is provided a sweep voltage generator 23 of which the input circuit is electrically coupled to the transmitter 17 so as to be energized in synchronism with the transmitter. The circuit constants of the generator 23 are selected to provide an output wave of saw-tooth shape, the slope of whose voltage rise is proportional to the sine of the angle $a$. Such generators are well-known and descriptions of the circuit arrangements and mode of operation thereof are contained in Principles of Radar, by the Members of the Staff of the Radar School, Massachusetts Institute of Technology, second edition, McGraw-Hill Book Co., New York, 1946. As in conventional radar plan-position-indicator (PPI) circuits, the sweep generator 23 is mechanically or electro-mechanically interconnected with the antenna 13 through motor 21 for the purpose of providing the desired saw-tooth voltage characteristic.

The saw-tooth voltage output of generator 23 is applied to a pair of electron-beam-deflecting plates 25 of the cathode ray tube 11, the control or intensity grid 27 of which is normally biased beyond cut off, by a suitable source of potential preventing formation of an electron beam. The grid bias is adjusted to a value such that application of an output pulse from the receiver 19 alone is insufficient to raise the grid voltage above cutoff.

As thus far described, and assuming that the output of the receiver 19 is directly applied to the control grid 27 of the tube 1, it will be seen that no indication is produced on the screen of the tube 11. However, in accordance with the invention, the arrangement is such that, at the instant a range pulse is received after reflection from surface $s$, the magnitude of the saw-tooth voltage output of the sweep generator 23 applied to deflecting plates 25 is proportional to $r \sin a$, and, were it not for the fact that the grid 27 is biased beyond cut off, an electron beam would be emitted and deflected by an amount corresponding to the deflecting voltage, which, in turn, is proportional to the horizontal deviation $d$.

It has been noted above that, for the purpose of contour-map making, only such data are utilized as correspond to points of incidence $p$ which are at distances corresponding to integral values of the preselected contour interval $i$. In other words, indications of received range pulses are made to correspond only to such pulses that are received from points lying on the intersections $c$ of the predetermined contour planes and the surface $s$.

Selective indication of the foregoing type is accomplished by combining an amplitude-limited version of the voltage output of receiver 19 with an amplitude-limited version of the signal output of an oscillator 29, which I term a contour oscillator for reasons that will presently appear. It will be seen that the combination of these output signals is effected in a mixer 31 and in a manner such that a resultant signal is derived, which is of sufficient magnitude to drive the control grid of the cathode ray oscilloscope above cut-off in accordance with the above-described mode of data presentation.

A block diagram of the contour oscillator arrangement is shown in Fig. 2, and comprises a conventional multivibrator 33 having its input circuit connected to the transmitter 17 so as to be triggered into operation synchronously with each transmitted pulse. The output of the multivibrator 33 is a rectangular wave of the form shown at B in Fig. 3, the wave form at A being representative of the output of the transmitter 17.

The rectangular voltage wave output of the multivibrator is connected to a shock-excited or "ringing" oscillator circuit 35, so-called, which in a well-known form described on pages 2—70 and 2—71 of the above-mentioned Principles of Radar, comprises a triode 37 having a normally unbiased grid 39 and an L-C tank circuit 41 connected between the cathode 43 and ground. In operation the triode 37 is normally conductive in the absence of signal on the grid, a steady current being maintained through the tube and the inductance 45 of the tank circuit 41. However, when the rectangular wave B is applied to the grid 39, the triode 37 is cut off and the inductor current flows into the condenser 47 starting oscillation as shown in Fig. 3 at C, which, in turn dies out at the end of the rectangular wave B. The substantially sine-wave output of the ringing circuit 35 is then fed to a voltage limiter, clipper and peaker arrangement 49 of conventional design which transforms the sinusoidal oscillations into a train of uniform pulses, as at D, in Fig. 3, including one pulse per cycle of the sine-wave input. A voltage-limiting clipping and peaking circuit useable herein is shown at page 2-73 of the Principles of Radar, supra.

The repetition rate of the train of pulses D may be varied by suitable adjustment of the inductance 45 and/or the capacitance 47 of the L-C network in the ringing circuit 35 to provide a train of narrow pulses having a time spacing or pulse-time-interval equal to the time of transit of a pulse from the transmitter 17 over a distance equal to twice the contour interval $i$.

It will be understood that the time-spacing of the pulse train D is selected to be equal to the time of transit of a transmitter pulse over a distance $2i$ only when the beam from the antenna 13 (Fig. 1) is directed parallel to the vertical $v$, e. g. for instantaneous values of angle $a$ equal to zero. For other values of $a$, however, the time-spacing of the pulse train is preferably altered to compensate for the increase in length of path traversed by the transmitted pulse between adjacent contour planes due to the angular deviation of the beam from the true vertical.

The augmented interval distance is proportional to $$i \sec a \qquad (3)$$

and variation of the time spacing between pulses of the train D in accordance therewith may readily be accomplished by varying the frequency of oscillation of the tank circuit 41 (Fig. 2) by a factor proportional to the cosine of the angle $a$. Accordingly, the condenser 47 may be made variable and provided with plates having a suitable shape to provide such a variation. Then, to effect continuously such frequency variation and thereby alter the time spacing in accordance with the desired correction, the variable condenser 47 may be mechanically coupled to the motor 21 for rotation in synchronism with the antenna 13, as shown in Fig. 1.

It will now be clear that the oscillator 29 is aptly termed a contour oscillator since it provides an output comprising a train of pulses of which the time interval between successive pulses is substantially equal to the time required for transit of a pulse from the transmitter to traverse the distance between adjacent contour intersection lines $c$, and independent of the angle $a$ between the direction of the beam from the transmitter and the true vertical to the datum plane 15.

As shown in Fig. 1, a strip of photo-sensitive film 51 is moved across the screen 53 of the cathode ray oscilloscope 11 by means of rollers 55 driven by means of a motor 57, which, if desired, may be the same as motor 21 interconnected by suitable reduction-gear mechanism to drive the rollers 55 at a suitable speed. The speed of movement of film 51 is related to the ground speed of the craft bearing the apparatus in a manner such that a map of the desired scale, relative to the terrain, is produced. If necessary or desired, the oscilloscope and film assembly may be contained in a suitable light-tight box 58 to minimize the danger of unwanted exposure of the film 51.

For purposes of description of the operation of the apparatus, let it be assumed that the craft is flying a horizontal course at a predetermined uniform speed and directed at right angles to the plane of the drawing in Fig. 1, that the angle $a$ of scan is sufficient to permit the beam of ultra-high-frequency wave energy periodically to illuminate the surface $s$, and further, that a predetermined desired contour interval $i$ is selected. Then, with the sweep circuit output applied to the deflecting plates 25 and the mixer output to the control grid 27, it will be apparent that, upon the occurrence of a coincidence, in the mixer 31, of a pulse from the contour oscillator 29 with a received pulse from the receiver 19, the output of the mixer 31 drives the grid 27 sufficiently positive to cause the electron beam of oscilloscope 11 to strike screen 53 forming a point of light 59 thereon, as shown in Fig. 4($a$). The position of the point 59 relative to the center of the screen 53 is, of course, determined by the instantaneous value of the sweep voltage on the plates 25, which, it will be recalled, varies as $r \sin a$, as indicated above. The point 59 illuminates the moving film 51 and exposes the film in a corresponding point 59', shown in Fig. 5.

During the continued scanning process, a succession of coincidences of pulses from receiver 19 and contour oscillator 29 are experienced, each corresponding to the reception of a transmitted pulse after reflection from a contour level. Examples of the cathode ray tube indications of such coincidences are shown in Figs. 4($b$), ($c$), ($d$) and ($e$), wherein the points 61, 63, 65 and 67 are displaced at distances from screen center in accordance with the respective values of the displacements $d$ of the corresponding reflection points from the vertical $v$.

The points 61, 63, 65 and 67 cause corresponding points 61', 63', 65' and 67' to be formed on the film 51, where, as shown in Fig. 5, the points are substantially aligned on a transverse line $x$—$x$. It will be seen that, as the film progresses at a predetermined rate across the field of the oscilloscope screen, and the scanning operation continues, additional points are provided adjacent the aforementioned points 61', 63', 65' and 67', which points, when integrated, define lines 69 and 71 that are respectively the loci of points of constant elevation on the surface $s$. This operation is continued until the desired area of surface has been surveyed.

For calibrating the contour map made in accordance with the present invention, a test run over a terrain on which ground control points of known elevation and location may be made. The map resulting from such a test run may then be compared with a map made over the surface to be surveyed to ascertain the elevations corresponding to the several contour lines.

Alternatively, a profile of the terrain to be surveyed may be made by means of any conventional type of absolute altimeter used in conjunction with the present map-making apparatus and adapted to be momentarily switched into operation at the instant that the antenna 13 is directed along the vertical $v$. Such a profile may be superposed directly on the film exposed as above-described, to provide readily accessible reference range markers for calibration.

While there has herein been disclosed and described an apparatus and method for making contour or topographic maps wherein the surface is scanned with pulsed ultra-high-frequency energy, it will be understood that this apparatus and method are equally well-suited for operation with transmitters of frequency-modulated wave energy. Also, both pulse-modulated and/or frequency modulated wave energies of ultra-sonic compressional as well as ultra-high-frequency electromagnetic waves are herein contemplated.

It is to be understood that various modifications and changes may be made in this invention without departing from the spirit and scope thereof.

The invention described herein may be manufactured and used by or for the Government of the United States of America for governmental purposes without the payment of any royalties thereon or therefor.

I claim:

1. Apparatus for making a topographic map of a surface comprising means for generating wave energy and for scanning the surface with a directional beam of said energy, means for receiving a portion of said wave energy after reflection thereof by substantially all parts of the scanned surface, means responsive to said received energy for deriving data therefrom related to the respective ranges of selected parts only of said reflecting surface, said parts being uniformly spaced from said apparatus according to predetermined discreet contour intervals, and means for translating the derived range data into a series of substantially continuous delineations, each said delineation corresponding to a predetermined contour level of the surface.

2. In apparatus for making a topographic map of a surface, the combination comprising means for generating ultra-high-frequency electromagnetic wave energy, means for scanning the surface with a directive beam of said wave energy and for receiving a portion of said wave energy after reflection thereof by the surface, means for generating a train of pulsed waves having a constant pulse-time-interval proportional to the time of transit of the reflected energy over a desired contour interval, and means for combining said received energy and said train of pulsed waves and for producing a resultant wave having a characteristic related to the range of the reflecting surface.

3. Apparatus for making a topographic map of a surface comprising means carried by a craft dirigible over the surface for generating a beam of ultra-high-frequency electromagnetic wave energy and for transmitting said beam to the surface, means for receiving a portion of said wave energy after reflection thereof by the surface, means responsive to said received energy for deriving data related to the range of the reflecting surface, and means including an intermittently actuatable fluorescent-screen device coupled to receive said data, and photographic means continuously operable in synchronism with the movement of said craft to record successive indications on the screen of said device, thereby to translate said range data into a series of substantially continuous delineations, each said delineation corresponding to a predetermined contour elevation of the surface.

4. Apparatus for making a topographic map of a surface comprising means for generating ultra-high-frequency electromagnetic wave energy, directive radiating means for transmitting a beam of said energy to the surface and for receiving a portion of said wave energy after reflection thereof by the surface, means for generating a train of pulsed waves having a pulse-time-interval proportional to the time of transit of the reflected energy over a desired contour interval, a mixer for mixing said received energy and said train of pulsed waves for deriving a resultant wave having a modulation component related to integral values of the range of the reflecting surface corresponding to a predetermined contour interval, and photosensitive means for translating said range data into a series of substantially continuous delineations, each said delineation corresponding to a predetermined contour level of the surface.

5. In a radiant-energy object-locating system wherein a directional beam of energy is projected toward an object, said beam being oscillable through a preselected scanning angle, and wherein energy reflected from the object is utilized to provide a visual representation of the object, the improvement that comprises means for generating signal pulses having a substantially constant interval between adjacent pulses corresponding to twice the time required for the reflected energy to traverse predetermined distances on the surface of the object, means for combining said signal pulses with the reflected energy to provide a control signal modulated in accordance with said interval, a cathode-ray indicator tube having a control grid, and means connecting the output of said combining means to said control grid.

6. The apparatus defined in claim 5 wherein said generating means is characterized by means for varying the interval between adjacent pulses in accordance with variation in angle of scan.

7. Apparatus for making a topographic map of a surface comprising means for generating wave energy and for scanning the surface with a directional beam of said energy, means for receiving a portion of said wave energy after reflection thereof by substantially all parts of the scanned surface, means responsive to said received energy for deriving a control signal therefrom related to the respective perpendicular ranges of parts only of said reflecting surface spaced from said apparatus according to a predetermined contour interval, and means for translating the derived range data into a series of substantially continuous delineations, each said delination corresponding to a predetermined contour level of the surface, said translating means comprising a cathode ray tube having a control grid and a screen, means for applying said control signal to said control grid, thereby to modulate the cathode ray to form on said screen discrete indications of the respective ranges of said parts of the surface, and means for continuously photographing the discrete indications on said screen.

8. Radiant energy mapping system comprising means for generating ultra-high-frequency electromagnetic wave energy, directive radiating means for transmitting a beam of said energy to the surface and for receiving a portion of said wave energy after reflection thereof by the surface and independently of the distance of said surface from said radiating means, means for generating a train of pulsed waves at a rate corresponding to the transit time of the transmitted energy between predetermined altitude levels on the surface to be mapped, a mixer for mixing said received energy and said train of pulsed waves for deriving a resultant wave having on and off modulation components related to integral values of the range of the altitude levels corresponding to a predetermined contour interval, a cathode ray tube having a control grid adapted for modulation by said resultant wave to provide discrete indications of said range values, and photosensitive means for translating said range data into a series of substantially continuous delineations, each said delineation corresponding to a predetermined altitude level of the surface.

9. A device for producing an electrical signal corresponding to the contour of a tridimensional surface comprising means for cyclically moving a source of energy transversely across said surface and progressively in a direction normal to said transverse direction, energy responsive means for producing a signal voltage in response to the reflection of energy from said surface from point to point along the path of said source, means for producing a discontinuously variable control voltage having a repetition period proportional to the transit time of the energy from said source over a predetermined space interval on said surface and in a direction perpendicular to said transverse and normal directions, and means for combining said signal and control voltages.

10. A contour indicating device for producing a visual indication of the contour of a tridimensional surface comprising means for cyclically moving a source of energy transversely across said surface and progressively in a direction normal to said transverse direction, energy responsive means for producing a signal voltage in response to the reflection of energy from said surface from point to point along the path of said source, means for producing discontinuously variable control voltage having a repetition period proportional to the transit time of the energy from said source over a predetermined space interval on said surface and in a direction perpendicular to both said transverse and normal directions, means for combining said signal and control voltages, and means to translate the combined voltages into a visual contour indication.

11. Apparatus for making a topographic map of a surface comprising means for generating wave energy and for scanning the surface with a directional beam of said energy, means for receiving a portion of said wave energy after reflection thereof by substantially all parts of the scanned surface, means responsive to said received energy for deriving data therefrom related to the respective ranges of selected parts only of said reflecting surface, said parts being uniformly spaced from said apparatus according to predetermined discreet contour intervals of substantially equal magnitude, and means for translating the derived range data into a series of substantially continuous delineations, each said delineation corresponding to a predetermined contour level of the surface.

WILLIAM T. HOLSER.

REFERENCES CITED

The following references are of record in the file of this patent:

UNITED STATES PATENTS

| Number | Name | Date |
|--------|------|------|
| 2,323,534 | Goddard | July 6, 1943 |
| 2,407,198 | Wolff | Sept. 3, 1946 |
| 2,421,747 | Engelhardt | June 10, 1947 |
| 2,426,189 | Espenschied | Aug. 26, 1947 |
| 2,428,351 | Ayres | Oct. 7, 1947 |
| 2,446,668 | Futtle et al. | Aug. 10, 1948 |

FOREIGN PATENTS

| Number | Country | Date |
|--------|---------|------|
| 108,556 | Australia | Sept. 28, 1939 |